(12) United States Patent
Carroll et al.

(10) Patent No.: US 8,629,666 B2
(45) Date of Patent: Jan. 14, 2014

(54) DYNAMIC CONTROL PARAMETER ADJUSTMENT IN A POWER SUPPLY

(75) Inventors: Robert T. Carroll, Andover, MA (US); Venkat Sreenivas, Winchester, MA (US)

(73) Assignee: International Rectifier Corporation, El Segundo, CA (US)

( * ) Notice: Subject to any disclaimer, the term of this patent is extended or adjusted under 35 U.S.C. 154(b) by 293 days.

(21) Appl. No.: 13/027,062

(22) Filed: Feb. 14, 2011

(65) Prior Publication Data
US 2013/0234691 A1    Sep. 12, 2013

Related U.S. Application Data

(60) Provisional application No. 61/389,619, filed on Oct. 4, 2010.

(51) Int. Cl.
*G05F 1/40* (2006.01)
*G05F 1/44* (2006.01)

(52) U.S. Cl.
USPC ........... 323/282; 323/284; 323/285; 323/286; 323/288; 323/222; 323/223

(58) Field of Classification Search
USPC ......... 323/282, 284, 285, 286, 266, 288, 222, 323/223
See application file for complete search history.

(56) References Cited

U.S. PATENT DOCUMENTS

| | | | |
|---|---|---|---|
| 6,690,147 B2 * | 2/2004 | Bonto | 323/280 |
| 7,710,091 B2 * | 5/2010 | Huang | 323/280 |
| 8,049,476 B2 * | 11/2011 | Schiff | 323/282 |
| 2006/0095869 A1 * | 5/2006 | Levy | 716/1 |
| 2007/0261010 A1 * | 11/2007 | Levy | 716/1 |
| 2010/0033153 A1 * | 2/2010 | Xing et al. | 323/288 |
| 2010/0148738 A1 * | 6/2010 | Schiff | 323/282 |

* cited by examiner

*Primary Examiner* — Bao Q Vu
(74) *Attorney, Agent, or Firm* — Chapin IP Law, LLC

(57) ABSTRACT

A power supply controller produces a compensation value based at least in part on: an estimated or known output capacitance of the power supply, a specified rate of changing a magnitude of the output voltage as specified by the voltage setting information, and/or a load-line resistance of the power supply. The power supply controller utilizes the compensation value to adjust a magnitude of the output voltage during a voltage transition in which the output voltage is changed from an initial output voltage setting to a target output voltage setting at a pre-specified rate.

23 Claims, 10 Drawing Sheets

DYNAMIC CONTROL PARAMETER ADJUSTMENT IN A POWER SUPPLY

RELATED APPLICATIONS

This application is related to and claims the benefit of earlier filed U.S. Provisional Patent Application Ser. No. 61/389,619 entitled "DYNAMIC VID VOLTAGE CORRECTION," filed on Oct. 4, 2010, the entire teachings of which are incorporated herein by this reference.

BACKGROUND

Conventional power supplies can be configured to implement an analog current sense circuit along with an external load-line resistor network. Based on an analog current sense and external load-line resistor, a controller can calculate a load line adjustment voltage. This load line adjustment voltage may be subtracted from a fixed reference voltage of the power supply to produce a final reference voltage in which to regulate the output voltage of the power supply.

Using load-line voltage adjustments as discussed above, when the output current of the power supply is relatively high, the load-line voltage adjustment value is relatively large, decreasing a magnitude of the output voltage by a relatively large amount. Conversely, when the output current of the power supply is relatively low, the load-line voltage adjustment value is relatively small, decreasing a magnitude of the output voltage by a relatively small amount. Accordingly, via so-called adaptive voltage positioning, a magnitude of the output voltage of the power supply can vary depending on whether the output voltage supplies a large or small amount of current to a respective load. These AVP adjustments can be used to help reduce a need for large output capacitors and/or filters.

Conventional power supply systems also can be configured to generate an output voltage based on received voltage setting information. For example, a power supply may receive a so-called VID (Voltage Identifier) value from a processor resource powered by the output voltage. In general, the VID specifies a magnitude of the output voltage to be generated by the power supply to power the processor load. Thus, the processor resource can specify a setting of the output voltage produced by the power supply to power the processor.

A magnitude of the VID value can vary over time. For example, the processor resource may request the power supply to generate the output voltage based on a first VID setting. Thereafter, due to a change in operating conditions, the processor may request the power supply to adjust the output voltage to a new VID setting. Thus, as operating conditions of the power supply change, the processor can provide notification of how to set the output voltage for the different conditions.

BRIEF DESCRIPTION

Conventional applications such as those as discussed above can suffer from a number of deficiencies. For example, conventional power supplies can initiate changing a magnitude of reference voltage used to, in turn, generate an output voltage from one setting to another as discussed above. However, during a transition between one output voltage setting and another based on use of received VID information, conventional power supplies control the output voltage of the power supply without considering an affect of charging or discharging output capacitors of the power supply during the transition. Thus, the output voltage of a conventional power supply can lag an actual output voltage that is to be applied to the load. In other words, a power supply may generate an output voltage at a first magnitude. A processor load may request that the power supply increase the output voltage at a specified rate between time T1 and time T2. Conventional power supplies may initiate a change in the magnitude between time T1 and time T2. However, conventional power supplies do not take into account that the output capacitors must be charged or discharged during the transition. Accordingly, conventional power supplies do not accurately produce a desired output voltage.

Embodiments herein deviate with respect to conventional applications. For example, embodiments herein are directed to one or more unique ways of adjusting control signals in a power supply to account for charging and/or discharging output capacitors of a power supply during a requested transition of changing the output voltage from one magnitude to another.

More specifically, one embodiment herein includes a controller configured to control an output voltage of a power supply that is used to power a load. A controller can receive output voltage setting information specifying how to control an output voltage of the power supply to power the load. In one embodiment, the resource can specify and notify the controller of output voltage setting information. In one embodiment, the output voltage setting information indicates when to implement one or more output voltage settings. The output voltage setting information also can indicate a specified rate of changing the output voltage of the power supply from one voltage setting to another.

In an example embodiment, to account for an affect that output capacitors have on changing a magnitude of the output voltage, the controller produces a compensation value. In one embodiment, the compensation value is based at least in part on the output capacitance of the power supply and the specified rate of changing a magnitude of the output voltage as specified by the voltage setting information. The controller utilizes the compensation value to adjust a magnitude of the output voltage during a voltage transition. As discussed herein, the output voltage produced by the power supply to power the load is more accurate because the controller takes into account that output capacitors of the power supply must be charged and/or discharged when changing a magnitude of the output voltage.

In accordance with a more specific embodiment, the controller can receive output voltage setting information specifying an initial output voltage setting and a target output voltage setting. The controller can also receive a voltage slope value indicative of a specified rate of changing the output voltage of the power supply from the initial output voltage setting to the target output voltage setting during a transition. In further embodiments, the output voltage setting information can specify a schedule and/or time when to produce the output voltage according to the different output voltage settings.

As previously discussed, the controller produces a compensation value based at least in part on an output capacitance of the power supply and a specified rate of changing a magnitude of the output voltage as specified by the voltage setting information. In a more specific embodiment, the controller multiplies an output capacitance of the power supply by the specified rate of changing the output voltage to produce a surge current value. The surge current value may be positive or negative. The surge current value indicates an amount of current to account for a change in the output voltage on the output capacitance during a transition of changing the magnitude of the output voltage from the initial output voltage setting to the target output voltage setting.

The controller can be configured to obtain or retrieve a load-line resistance value of the power supply. Note that a value representative of the output capacitance and load-line resistance value can be stored as power supply configuration information accessible by the controller to produce calculations as discussed herein.

In one embodiment, the controller multiplies the calculated surge current value by the loadline resistance value to produce a compensation value. For example, in one embodiment, the controller produces the compensation value, $V_{COMP}$, as follows:

$$V_{COMP} = R_{LL} * C_{OUT} * V_{SLOPE}$$

where $V_{COMP}$=compensation value;

$R_{LL}$=load-line resistance value associated with the power supply;

$C_{OUT}$=the output capacitance of the power supply;

$V_{SLOPE}$=specified rate of changing magnitude from the initial output voltage setting to the target voltage setting.

In accordance with one embodiment, the controller applies the compensation value to a setpoint value such a VID of the power supply to produce an adjusted setpoint value. The setpoint value or voltage reference can be compared to a current magnitude of the output voltage to produce the error voltage that is used to control the power supply.

In further embodiments, the controller can utilize the compensation value, $V_{COMP}$, to adjust the output voltage of the power supply during a transition. For example, during the transition from one VID value to another, the controller controls switching of the power supply based on the adjusted VID values or setpoint value to account for a surge current required to charge or discharge the output capacitors of the power supply.

In one embodiment, the controller can be configured to sum the compensation value with a control parameter such as an error voltage of the power supply to produce an adjusted error voltage. In such an instance, the controller controls a state of one or more switches in at least one power converter phase of the power supply based on the adjusted error voltage taking into account $V_{COMP}$. More specifically, during a transition of the output voltage to a target value as specified by the output voltage setting information, the controller utilizes the compensation value to adjust control signals generated by the controller. The controller applies the adjusted control signals to at least one switching circuit of the power supply to adjust the output voltage of the power supply during the transition of the output voltage to the target value.

These and other more specific embodiments are disclosed in more detail below.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by CHiL Semiconductor of Tewksbury, Mass., USA.

As discussed herein, techniques herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a unique and cost effective implementation of load-line voltage compensation during an output voltage transition.

For example, in one embodiment, a power supply controller receives output voltage setting information specifying settings for controlling an output voltage used to power the load. The output voltage setting information indicates information such as when to implement the output voltage settings as well as indicates a specified rate of changing the output voltage of the power supply from one voltage setting to another.

In an example embodiment, the power supply controller includes circuitry to produce a load-line voltage compensation value based at least in part on: an estimated or known output capacitance of the power supply, a specified rate of changing a magnitude of the output voltage as specified by the voltage setting information, and/or a load-line resistance of the power supply. The power supply controller utilizes the compensation value to adjust a magnitude of the output voltage during at least a voltage transition in which the output voltage is changed from an initial setting to a target setting at a specified rate.

As discussed herein, the output voltage produced by the power supply and supplied to power the load is more accurate because the generated load-line compensation voltage takes into account that output capacitors of the power supply must be charged and/or discharged when changing a magnitude of the output voltage. Hence, the controller and power supply as discussed herein produces a more accurate output voltage for powering a respective load.

Figure 1:
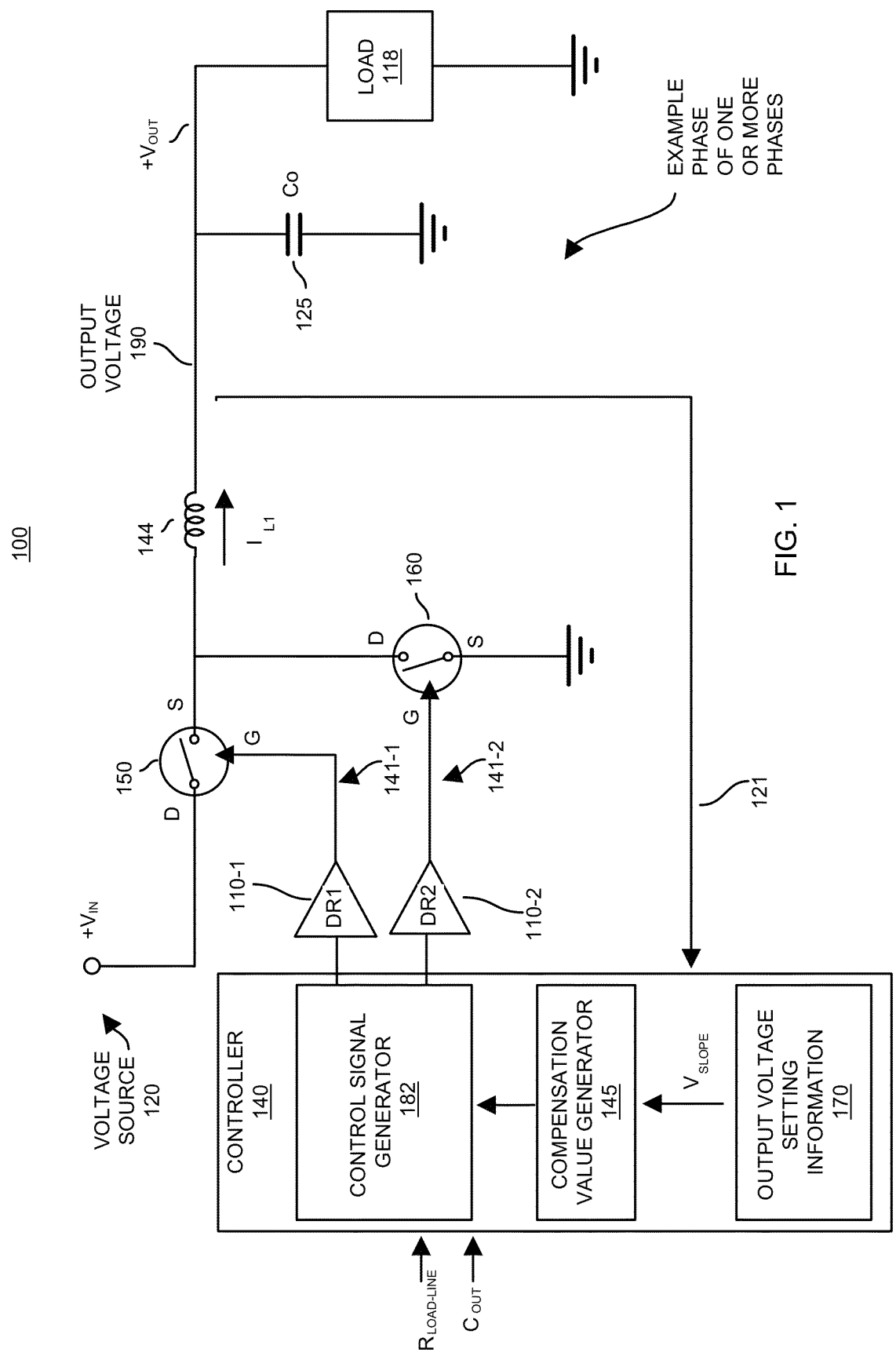
FIG. 1 is an example diagram of a power supply according to embodiments herein.

FIG. 1 is an example diagram of a power supply 100 according to embodiments herein.

As shown, the power supply 100 includes controller 140. Controller 140 controls an operation of drivers 110 to produce output voltage 190 to supply power to load 118. Drivers 110 control a state of respective switches 150 and 160. Controller 140 receives inputs 121 such as power supply parameters. The controller 140 can monitor parameters such as Vin, $I_{L1}$, Vout, etc., as well as configuration information such as $R_{LOAD-LINE}$, $C_{OUT}$, etc.

Based on the received inputs 121 and configuration settings of controller 140, controller 140 generates respective control signals via control signal generator 182. The generated control signals are outputted to the drivers 110 to control a state of switches 150 and 160.

For example, the controller 140 outputs the control signals (produced by control signal generator 182) to switch the control switch 150 (e.g., high side switch) and synchronous switch 160 (e.g., low side switch) ON and OFF. Appropriate switching operation of the control switch 150 and the synchronous switch 160 ON and OFF produces output voltage 190 to power load 118. Based on control signals produced by controller 140, driver 110-1 controls a state of the control switch 150 and driver 110-2 controls a state of the synchronous switch 160 in power supply 100.

Note that driver circuits 110 (e.g., driver circuit 110-1 and driver circuit 110-2) can be located in any suitable location such as in the controller 140 or at a remote location with respect to the controller 140.

When control switch 150 is turned ON (i.e., activated) via control signals generated by controller 140 (while the synchronous switch 160 is OFF), the current through inductor resource 144 increases based on a highly conductive path provided by control switch 150 between voltage source 120 and inductor resource 144.

In a switching mode, when synchronous switch 160 is turned ON (i.e., activated) via control signals generated by controller 100 (while the control switch 150 is OFF), the current through inductor resource 144 decreases based on a highly conductive path provided by the synchronous switch 160 between the inductor resource 144 and ground as shown.

Based on switching of the control switch 150 and the synchronous switch 160 in a continuous or discontinuous mode, the controller 140 regulates the output voltage 190 within a desired range to power load 118. As will be discussed later in this specification, the controller can implement one or more load-line voltage correction techniques.

In one embodiment, power supply 100 includes multiple phases. Each of the multiple phases can operate in a similar manner as the example phase shown in FIG. 1. In such an embodiment, the controller 100 operates the phases to maintain the output voltage 190 within a desired range to power load 118. The phases can be operated out of phase with respect to each other.

Each phase can include a respective high side switch circuit and low side switch circuit as previously discussed for the phase shown in FIG. 1. To deactivate a respective phase, the phase controller 140 can set both high side switch circuitry and low side switch circuitry of the respective phase to an OFF state. When off or deactivated, the respective phase does not contribute to producing current to power the load 118.

The controller 140 can select how many phases to activate depending on an amount of current consumed by the load 118. For example, when the load 118 consumes a relatively large amount of current, the controller 100 can activate multiple phases to power the load 118. When the load 118 consumes a relatively small amount of current, the controller 140 can activate a single phase or fewer phases to power the load 118.

Any of multiple different suitable types of methods such as estimations or physical measurements can be used to detect an amount of current consumed by the load 118, an amount output capacitance $C_{OUT}$ of output capacitors 125, etc.

Controller 140 receives output voltage setting information 170 from any suitable source such as a processor aware of power or current consumption requirements of load 118. In other words, a load such as a processor can provide feedback as to the amount of current to be consumed by the load 118 over time.

In one embodiment, the resource can specify and notify the controller 140 of output voltage setting information 170 over a communication link between the load (or other resource) and the controller 140. In one embodiment, the output voltage setting information 170 can indicate parameters such as when to implement different output voltage settings, a desired rate of changing the output voltage of the power supply from one voltage setting to another, an amount of current to be consumed by the at different intervals of time, an initial output voltage magnitude, target output voltage magnitude, etc.

In a further example embodiment, the controller 140 includes compensation value generator 145. In one embodiment, the compensation value generator 145 produces a compensation value based at least in part on an output capacitance of output capacitors 125 of the power supply and the desired rate of changing a magnitude of the output voltage 190 as specified by the voltage setting information 170.

Via control signal generator 182, the controller 140 then utilizes the generated compensation value to adjust a magnitude of the output voltage 190 during each of one or more voltage transitions. As discussed herein, the output voltage 190 produced by the power supply 100 and supplied to power the load is more accurate than conventional techniques because, via a compensation value generated by compensation value generator 145, the control signal generator 182 of controller 140 takes into account that output capacitors 125 of the power supply 100 must be charged and/or discharged when the controller implements changing a magnitude of the output voltage 190.

Figure 2:
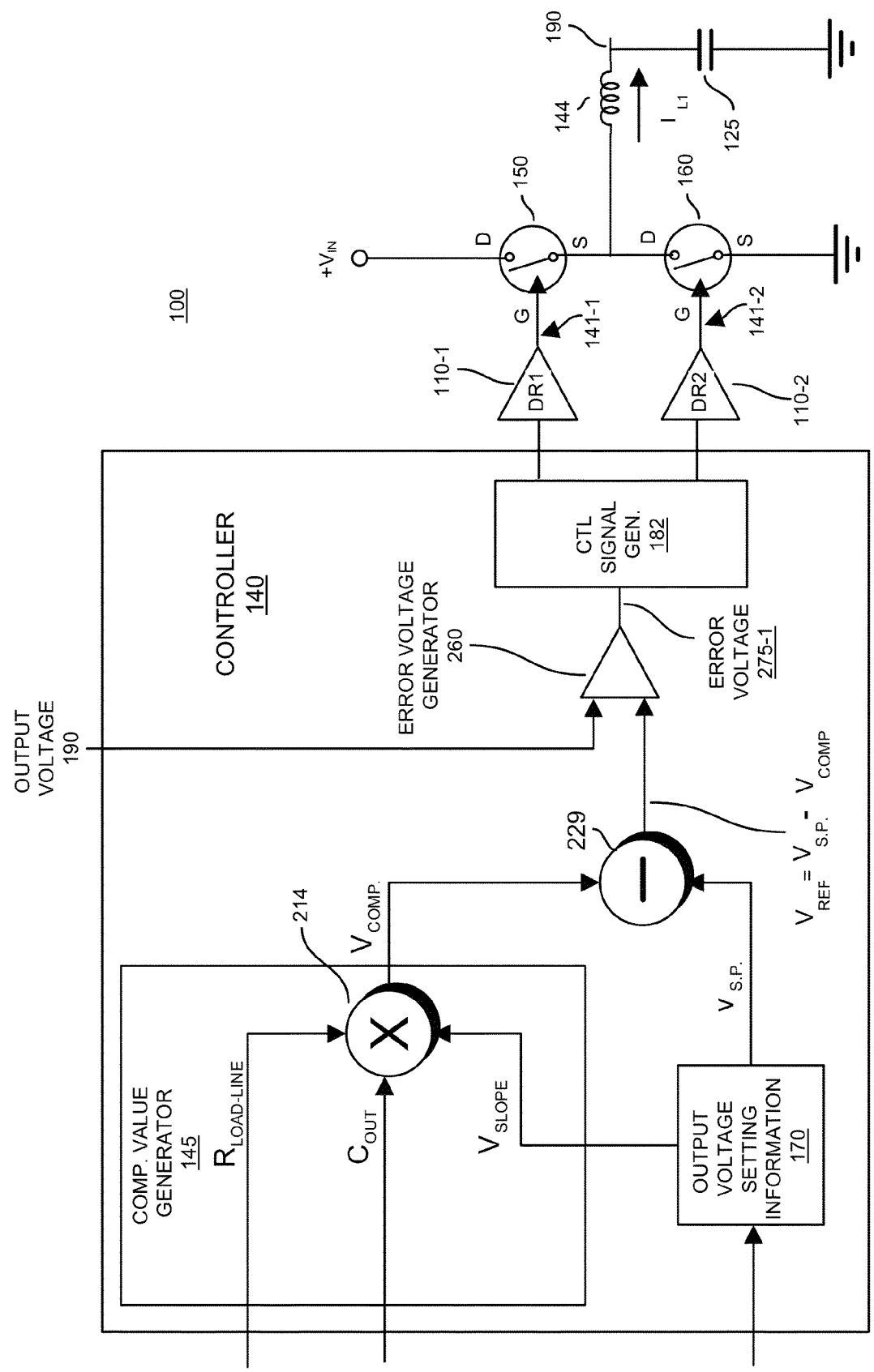
FIG. 2 is an example diagram of a controller and corresponding compensation circuitry according to embodiments herein.

FIG. 2 is a detailed diagram of a controller and compensation value generator according to embodiments herein.

As previously discussed, the controller 140 receives output voltage setting information 170 specifying how to control an output voltage 190 of the power supply 100 over time.

In this example, assume that the output voltage setting information 170 specifies an initial output voltage setting and a target output voltage setting. As previously discussed, the output voltage setting information 170 received from a remote source can include voltage slope information indicative of a desired rate of changing the output voltage 190 of the power supply 100 from the initial output voltage setting to the target output voltage setting during an output voltage transition.

The output voltage setting information 170 received by the controller 140 can also specify a schedule and/or time when the power supply should produce the specified output voltage values.

As previously discussed, the controller 140 includes compensation value generator 145 to produce a compensation value, $V_{COMP}$, based at least in part on an output capacitance of the power supply 100 and a desired rate of changing a magnitude of the output voltage 190 as specified by the voltage setting information 170.

More specifically, in one embodiment, via compensation value generator 145, the controller 140 multiplies an output capacitance associated with capacitors 125 by the desired rate of changing the output voltage as specified by the output voltage setting information 170 to produce a surge current value. The surge current value indicates an amount of current to account for a change in the output voltage 190 on the output capacitors 125 during a transition of changing the magnitude of the output voltage 190 from an initial output voltage setting to a specified target output voltage setting.

In certain embodiments, the controller 140 obtains or retrieves a load-line resistance value of the power supply 100 to calculate a compensation value.

Note that the output capacitance (e.g., $C_{OUT}$) and load-line resistance (e.g., $R_{LOAD-LINE}$) value can be stored as power supply configuration information accessible by the controller 140 to produce calculations as discussed herein.

In one embodiment, the controller 140 multiplies the surge current value by the loadline resistance value to produce a compensation value.

For example, the arithmetic operator function 214 (such as a multipler) receives $R_{LL}$, $C_{OUT}$, $V_{SLOPE}$ and produces the compensation value, $V_{COMP}$, as follows:

$$V_{COMP} = R_{LOADLINE} * C_{OUT} * V_{SLOPE}$$

where $V_{COMP}$=compensation value to account for surge current;
$R_{LL}$=load-line resistance value associated with the power supply;
$C_{OUT}$=the output capacitance associated with output capacitors 125 of the power supply;
$V_{SLOPE}$=desired rate of changing magnitude from initial output voltage setting to a target voltage setting.

As discussed herein, the controller 140 utilizes the compensation value, $V_{COMP}$, to adjust the output voltage 190 of the power supply during the transition of the output voltage 190 from one magnitude to another.

In accordance with one embodiment, the controller 140 also includes arithmetic function 229 to apply the compensation value $V_{COMP}$ to adjust a setpoint voltage, $V_{SP}$, of the power supply 100. In accordance with such an embodiment, the controller 140 applies the compensation value to a setpoint value such as a reference voltage of the power supply to produce an adjusted setpoint value.

In one embodiment, the setpoint value $V_{SP}$ is a VID voltage value indicative of a desired magnitude setting of the output voltage 190. The magnitude of the output voltage 190 can ratiometrically track the reference voltage, $V_{REF}$. Thus, changing a magnitude of the $V_{SP}$ causes a change in the magnitude of the output voltage 190.

Applying the compensation value to adjust a setpoint of the power supply can include subtracting the compensation value, $V_{COMP}$, from a setpoint voltage of the power supply to produce the output voltage reference value, $V_{REF}$, as shown.

During the transition when the magnitude of the output voltage 190 is changed from one magnitude to another, the control signal generator 182 of controller 140 controls switching of switches 150 and 160 in the power supply based on the adjusted setpoint value $V_{REF}=V_{SP}-V_{COMP}$ (as opposed to the conventional setpoint value that does not provide compensation) to account for a surge current required to charge or discharge the output capacitors 125 of the power supply during the voltage change.

More specifically, in one embodiment, the error voltage generator circuit 260 compares reference voltage $V_{REF}$ to the magnitude of the output voltage 190 to produce a difference value, error voltage 275-1. Based on the error voltage 275-1, the control signal generator 182 produces control signals to control switches 150 and 160.

Embodiments herein include adjusting received VID setting information using the generated compensation value (FIG. 2) and/or adjusting an error voltage of the power supply 100 (FIG. 10) using the compensation value to produce a more accurate output voltage 190 as the compensation value, $V_{COMP}$, takes into account an amount of surge current required to charge and/or discharge the output capacitors 125 during the voltage change. In one embodiment, the error voltage 275-1 is equal to a difference between $V_{REF}$ and the output voltage 190.

Figure 10:
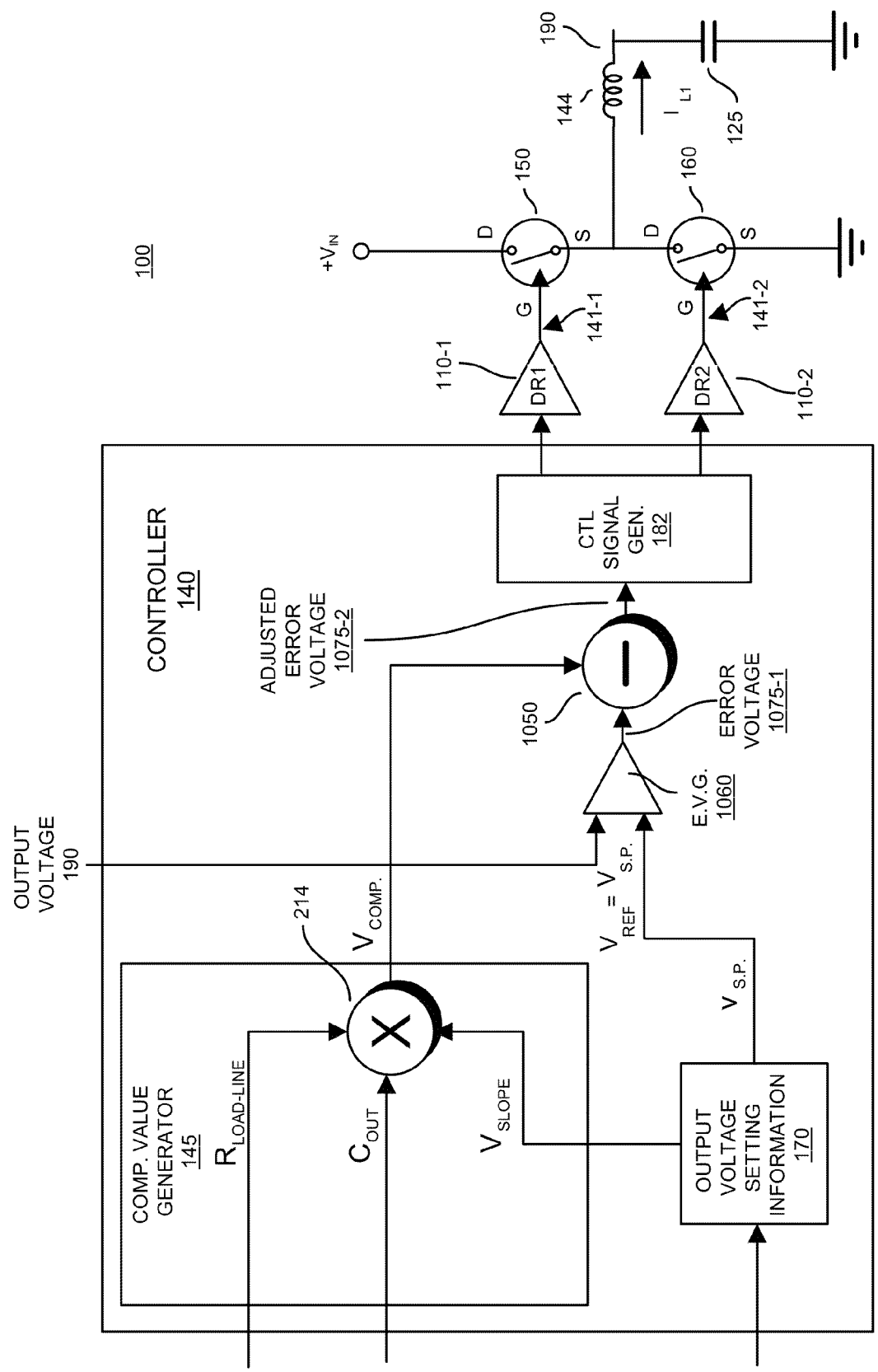
FIG. 10 is an example diagram of a controller and corresponding compensation circuitry according to embodiments herein.

FIG. 10 is an example diagram illustrating an alternative way of compensating according to embodiments herein.

In this example embodiment, the controller includes error voltage generator circuit 1060. Error voltage generator circuit 1060 receives the setpoint voltage value $V_{SP}$ and output voltage 190. The error voltage generator circuit 1060 generates error voltage 1075-1, which represents a difference between the output voltage 190 and the setpoint value. The arithmetic function 1050 (e.g., subtractor, adder, etc.) receives the error voltage 1075-1 and the $V_{COMP}$ value and produces the adjusted error voltage 1075-2. The adjusted error voltage 1075-2 equals the error voltage 1075-1 minus the compensation value, $V_{COMP}$. In a similar manner as previously discussed, the control signal generator 182 controls switching of switches 150 and 160 to control a magnitude of the output voltage 190.

Figure 3:
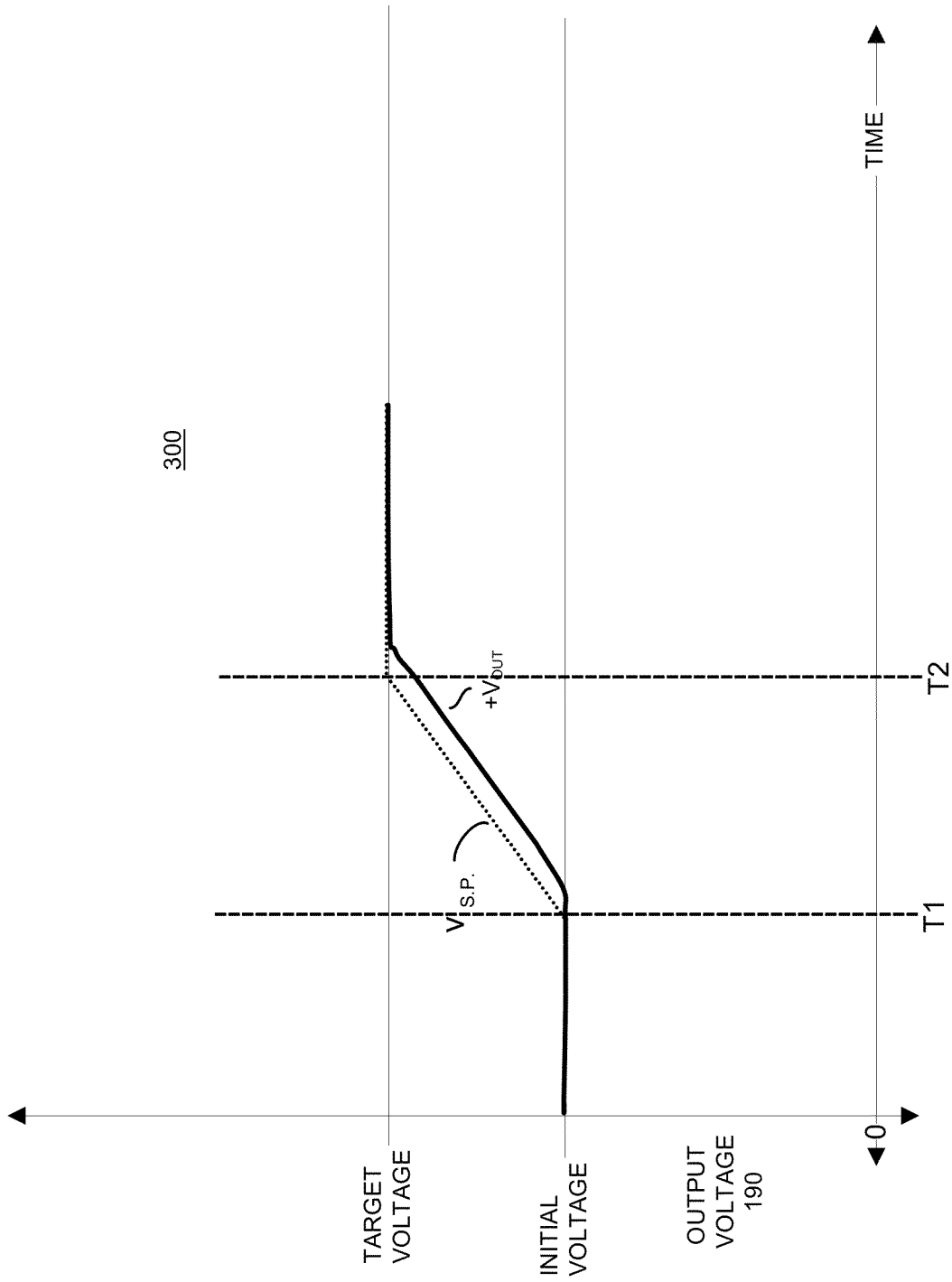
FIG. 3 is an example theoretical timing diagram illustrating the inaccuracy of producing an output voltage according to conventional techniques.

FIG. 3 is an example timing diagram illustrating theoretical results of producing an output voltage 190 according to conventional power supply systems that do not implement $V_{COMP}$ as discussed herein.

As shown in timing diagram 300, the conventional power supply applies a change to the VID setting of the conventional power supply between time T1 and time T2. $V_{SP}$ represents the VID value or the requested magnitude of the output voltage to be applied at the given time in the timing diagram 300. The reference voltage or VID voltage in the conventional power supply is not adjusted based on $V_{COMP}$ as previously mentioned.

Upon receiving a new setpoint value, VSP, during a transition between T1 and T2, the magnitude of the output voltage 190 ($V_{OUT}$) of the conventional power supply lags the setting $V_{SP}$ because the conventional power supply does not take into a surge current required to charge the output capacitors in the conventional power supply. Thus, during a voltage transition, the conventional power supply does not produce an accurate output voltage as requested by a processor load or other source.

Figure 4:
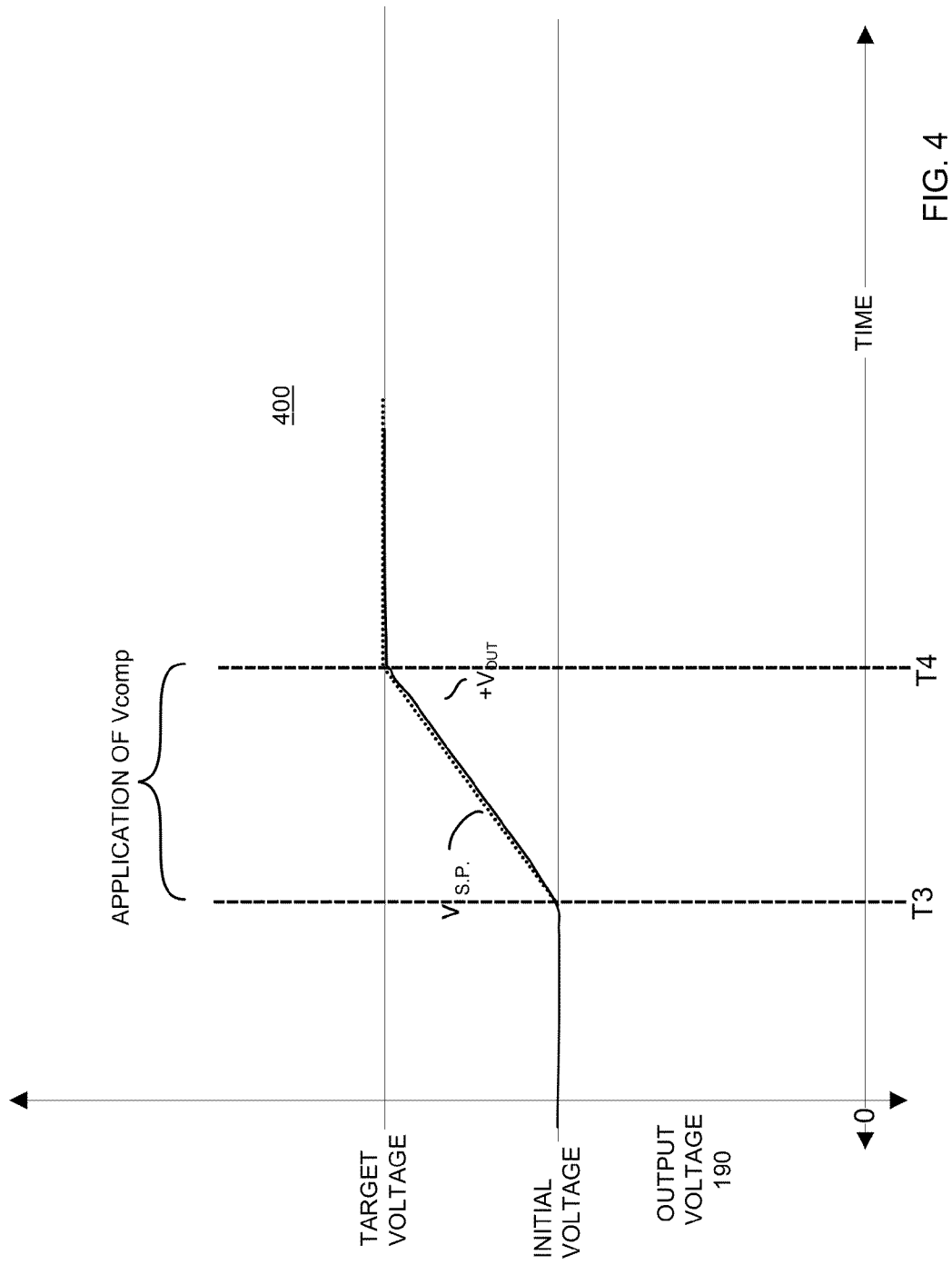
FIG. 4 is an example theoretical timing diagram illustrating dynamic VID compensation and more accurate generation of an output voltage according to embodiments herein.

FIG. 4 is an example timing diagram illustrating theoretical results of producing a more accurate output voltage based on implementing compensation during a transition according to embodiments herein.

As shown in timing diagram 400 of FIG. 4, based on use of $V_{COMP}$ as discussed herein, power supply 100 applies a change to the VID setting and/or error voltage setting of power supply 100 between time T3 and time T4 to compensate for the charging of output capacitors 125 during the voltage transition.

In one embodiment, as previously discussed, $V_{SP}$ represents the VID value or the requested magnitude of the output voltage 190 to be applied at the given time in the timing diagram 400. As shown, the magnitude of the output voltage 190, $V_{OUT}$, is substantially equal to the setting $V_{SP}$ because power supply 100 takes into account a surge current required to charge the output capacitors 125 during the voltage transition. Accordingly, during a voltage transition, power supply 100 produces a more accurate output voltage 190 as requested by a processor load when compared to conventional power supply techniques.

Figure 5:
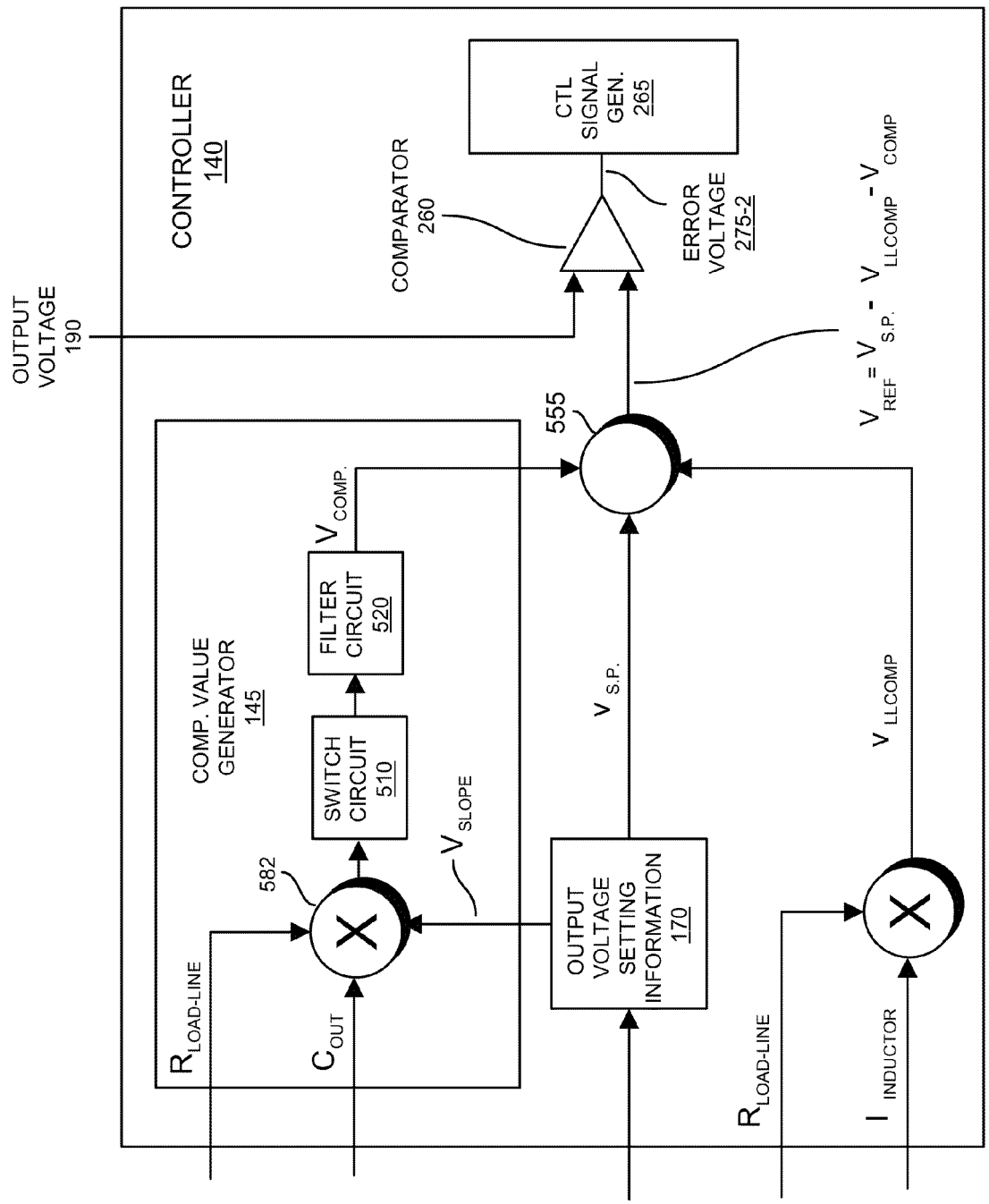
FIG. 5 is an example diagram of a controller and corresponding compensation circuitry according to embodiments herein.

FIG. 5 is an example diagram illustrating an example power supply according to embodiments herein.

In general, the power supply as shown in FIG. 5 operates in a similar manner as previously discussed. However, the power supply in FIG. 5 illustrates an implementation in which the compensation value generator 145 includes switch function 510 and filter circuit 520.

During operation, switch function 510 is activated during a respective voltage transition such that the value, $V_{COMP}$, is used to adjust a setpoint or error voltage during the output voltage magnitude transition as previously discussed. Filter circuit 520 can be a digital low pass filter matching a standard analog load-line voltage adjustment circuits present in the controller circuit.

As mentioned, the controller 140 can be configured to monitor a resource such as a processor or other resource for a dynamic VID (Voltage Identification) change request. The VID voltage command can be received from the processor (e.g., load 118) or other resource controlling a magnitude of the output voltage 190 over time.

The processor may request that the power supply produce the output voltage 190 at a specified voltage magnitude. In addition to specifying the VID voltage, the processor may also indicate a rate at which to change the output voltage at a particular time. Accordingly, the processor or other resource can control a timing and magnitude of the output voltage of the power supply as previously discussed.

By way of further non-limiting example, assume that a magnitude of the starting output voltage is 0.8 volts. The processor may request that the power supply change the output voltage to a magnitude of 1.2 volts. In addition to magnitude information, the controller may also receive slope information from the processor indicating a desired rate at which to change the output voltage from the starting voltage to an ending value such 1.2 volts. By way of a non-limiting example, the processor may specify that the rate change on the output voltage be 5 millivolts/microsecond. The rate of change can be specified as a value in a range between 1 and 500 millivolts/microsecond or, in other embodiments, any other suitable value.

The value of the output capacitance associated with output capacitors 125 can be programmed in a storage device such as a register of the power supply 100. $C_{OUT}$ is a pre-known value stored in non-volatile memory of the voltage regulator (i.e., power supply) because an output capacitance of the output capacitors is known depending on how the power supply is populated with components.

In one embodiment, the value of $C_{OUT}$ is estimated based on the amount of physical output capacitors 125 in the power supply 100. $C_{OUT}$ can be provided by an administrator, user, etc., configuring the power supply 100.

A surge current that is required to charge the capacitance $C_{OUT}$ during a voltage change is as follows:

Surge current=$C_{OUT}*dv/dt$, where $C_{OUT}$ is the programmed capacitance value and $dv/dt$ is the requested rate of changing the VID over time.

As discussed below, embodiments herein take into account the (positive or negative) surge current needed to charge and/or discharge $C_{OUT}$. For example, the surge current is positive when the output voltage is changed from a low voltage to a higher output voltage. The surge current is negative when the output voltage is changed from a higher output voltage to a lower output voltage. The surge current is an estimate (produced by controller 140) of an amount of current to charge the output capacitance based on the desired rate of changing the output voltage.

The Surge load line voltage compensation value ($V_{COMP}$) =Surge current multiplied by the load line resistance. The value of the load line resistance can be programmed in a register of the power supply. By way of a non-limiting example, the load line resistance value is typically be between 0.01 and 500 milliohms, although the load-line resistance can be any suitable value inside or outside of this range.

Just as in the surge current case, the surge load line voltage compensation value (i.e., $V_{COMP}$) can be positive or negative depending on the starting and ending voltage values for the magnitude of the output voltage.

The controller circuit can include a filtered analog implemented load line voltage compensation value. The bandwidth of the filter circuit 520 can match the bandwidth characteristics of analog implemented filter. In one embodiment, the bandwidth of the filter circuit is programmed in a register (memory).

The surge load line voltage compensation value outputted from multiplier function 582 can be digitally filtered via filter circuit 520.

One embodiment herein includes digitally adding the filtered surge load line voltage to the digital error to cancel the effect of the surge load line voltage:

$$V_{REF}=V_{SP}-V_{LLCOMP}-V_{COMP}$$

where $V_{REF}$ is the adjusted reference voltage or setpoint value inputted to the error voltage generator circuit 275-2;

$V_{SP}$ is the unadjusted setpoint or VID value received from the processor or other source;

$V_{LLCOMP}$ is a conventional load-line compensation value based on an amount of current supplied to the load through the inductors of the power supply; and $V_{COMP}$ is a compensation value to adjust for the charging and/or discharging of the output capacitors 125 as previously discussed.

By adding the estimated surge load-line voltage value to produce the error voltage, Verror, as shown in FIG. 3, embodiments herein cancel the affects of the surge current and the output voltage 190 more accurately reflects the requested output voltage as specified by the output voltage setting information 170.

Thus, instead of using merely a conventional Verror term to control the output voltage, the controller 140 in FIG. 5 can use a compensated error voltage value or compensated VID value. By adjusting the Verror term and/or VID value of the power supply by $(R_{LOADLINE})*(C_{OUT})*(DVID$ rate or $V_{SLOPE})$, and thus taking into account the current sourced or sinked by the output capacitors during a change in the output voltage, the controller 140 in FIG. 5 provides a more accurate output voltage to power the processor load based on inputted power supply commands.

Figure 6:
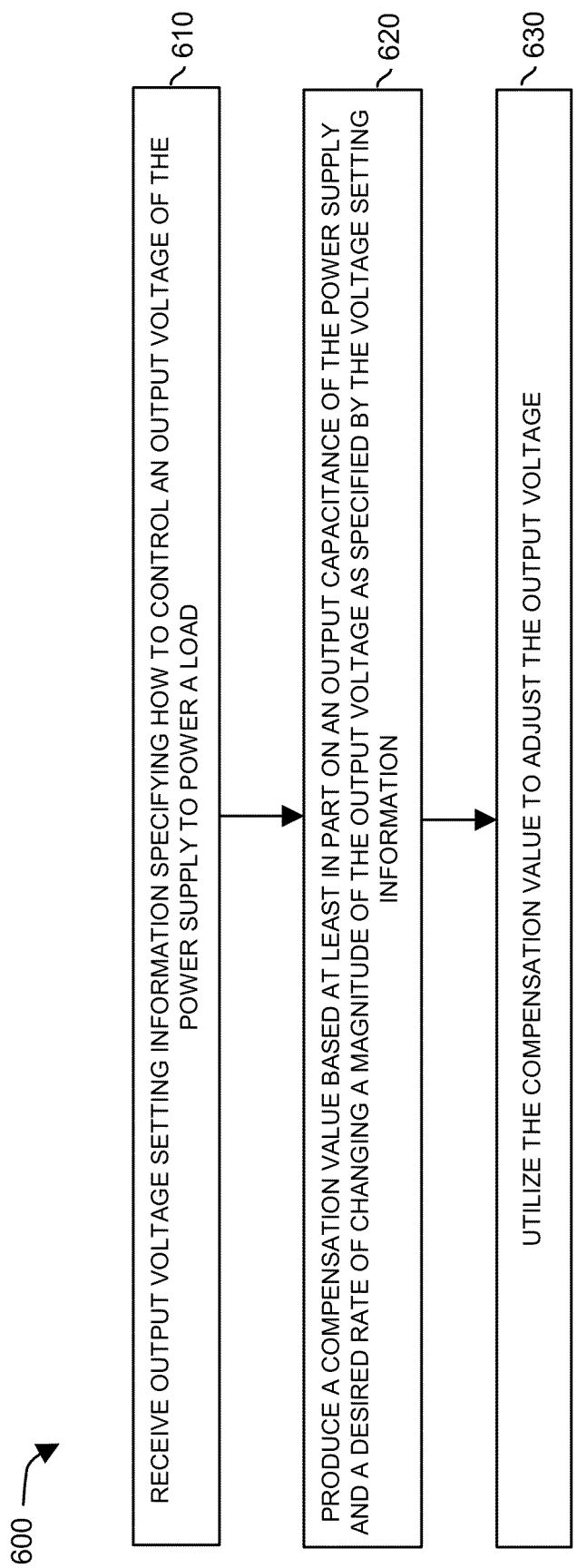
FIG. 6 is an example flowchart diagram illustrating compensation during an output voltage transition according to embodiments herein.

FIG. 6 is a flowchart 600 illustrating an example method of controlling operation of a power supply 100 according to embodiments herein. Note that there will be some overlap with respect to concepts as discussed above. Also, the steps can be executed in any suitable order.

In step 610, the controller 140 receives output voltage setting information 170 specifying how to control the output voltage 190 of the power supply 100 to power load 118.

In step 620, the controller 140 produces a compensation value based at least in part on an output capacitance (e.g., output capacitors 125) of the power supply 100 and a desired rate of changing a magnitude of the output voltage 190 as specified by the voltage setting information 170.

In step 630, the controller 140 utilizes the compensation value to adjust the output voltage 190 in accordance with the output voltage setting information 170.

Figure 7:
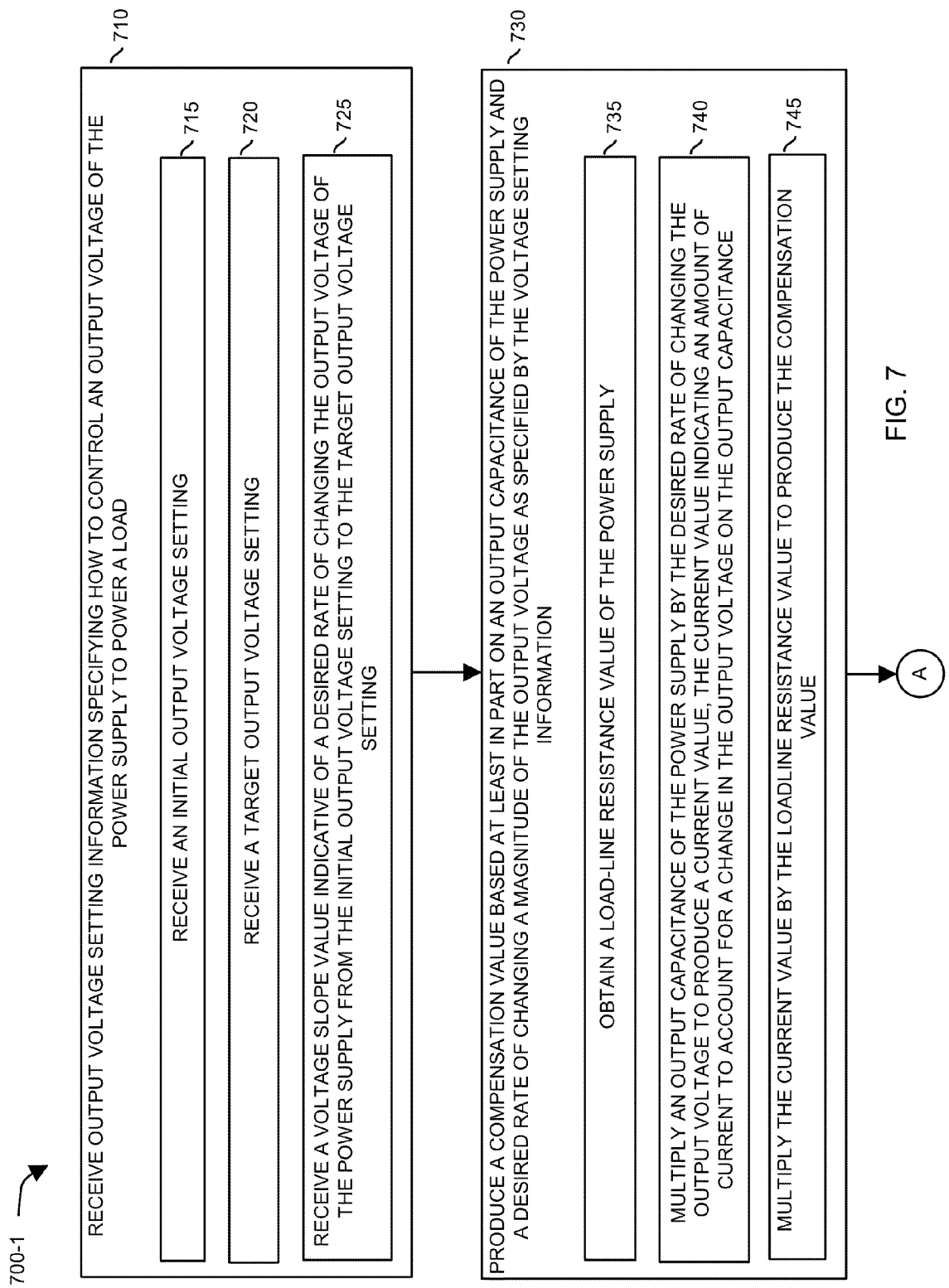
FIGS. 7 and 8 combine to form a detailed flowchart illustrating an example method according to embodiments herein.
Figure 8:
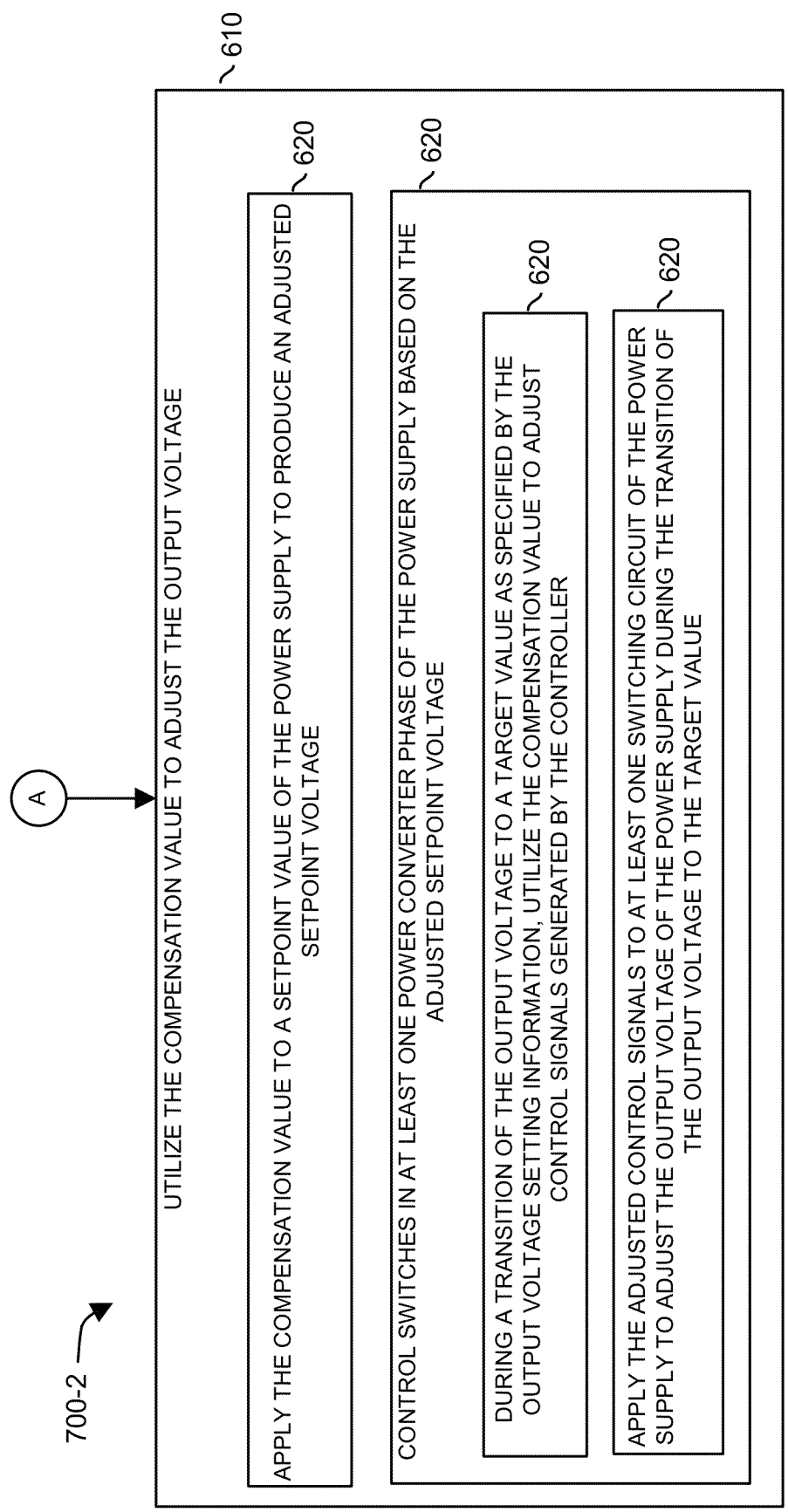

FIGS. 7 and 8 combine to form flowchart 700 (e.g., flowchart 700-1 and flowchart 700-2) illustrating a detailed example method of operating power supply 100 according to embodiments herein. Note that there will be some overlap with respect to concepts as discussed above. The steps below can be executed in any suitable order.

In step 710 of flowchart 700-1, the controller 140 receives output voltage setting information 170 specifying how to control a magnitude of the output voltage 190 over time.

In sub-step 715 the controller 140 receives an initial output voltage setting.

In sub-step 720 the controller 140 receives a target output voltage setting.

In sub-step 725 the controller 140 receives a voltage slope value such as $V_{SLOPE}$, which is indicative of a desired rate of changing the output voltage of the power supply 100 from the initial output voltage setting to the target output voltage setting.

In step 730, the controller 140 produces a compensation value based at least in part on an output capacitance (e.g., a capacitance associated with output capacitors 125) of the power supply 100 and a desired rate (e.g., $V_{SLOPE}$) of changing a magnitude of the output voltage 190 as specified by the voltage setting information 170.

In sub-step 735, the controller 140 multiplies the output capacitance of the power supply 100 by the desired rate of changing the output voltage 190 to produce a current value. The current value indicates an estimated amount of surge current required to account for a desired change in the output voltage 190 on the output capacitors 125. In other words, the estimated current represents a surge of how much current (either positive or negative) is needed to charge or discharge the output capacitors 125 during the scheduled change in output voltage 190 from the initiate output voltage to the target output voltage.

In sub-step 740, the controller 140 obtains a load-line resistance value (e.g., $R_{LOAD-LINE}$) of the power supply 100.

In sub-step 745, the controller 140 multiplies the current value by the loadline resistance value such as $R_{LOAD-LINE}$ to produce load-line voltage compensation value, $V_{COMP}$, for the surge current associated with the output capacitors 125. In other words, in accordance with one embodiment, the controller 140 calculates $V_{COMP}$ as follows:

$$VCOMP = R_{LOAD-LINE} * C_{OUT} * V_{SLOPE}$$

In step 810 of FIG. 8, the controller 140 utilizes the compensation value $V_{COMP}$ to adjust a magnitude of the output voltage 190.

In sub-step 815, the controller 140 applies the compensation value, $V_{COMP}$, to a setpoint voltage, $V_{SP}$. In one embodiment, the controller applies the value $V_{COMP}$ to the setpoint voltage to produce an adjusted setpoint voltage or adjusted reference value, $V_{REF}$.

In sub-step 820, the controller 140 controls switches in at least one power converter phase of the power supply 100 based on the adjusted setpoint voltage such as $V_{REF}$.

In sub-step 825, during a transition of the output voltage 190 to a target value as specified by the output voltage setting information 170, the controller 140 utilizes the compensation value, $V_{COMP}$, to adjust control signals driving driver 110-1 and driver 110-2.

In sub-step 830, the controller 140 applies the adjusted control signals to at least one switching circuit (e.g., control 150 and synchronous switch 160) of the power supply 100 during the transition of the output voltage to the target value to provide compensation to the output voltage 190 of the power supply 100 during the transition of the output voltage to the target value.

Note that the controller 140 and/or power supply can be provided by or include a computer, processor, micro-controller, digital signal processor, etc., configured to carry out and/or support any or all of the method operations disclosed herein. In other words, the controller 140 as discussed herein can include one or more computerized devices or processors can be programmed and/or configured to operate as explained herein to carry out different embodiments of the invention.

Note that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or a non-transitory computer readable media) including computer program logic encoded thereon that, when performed in a computerized device having a processor and corresponding storage, programs the processor to perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the controller 140 to cause the controller 140 to perform the techniques explained herein.

Accordingly, one particular embodiment of the present disclosure is directed to a computer program product that includes a non-transitory computer readable hardware storage medium (e.g., memory, storage repository, optical disk, integrated circuit, etc.). In other words, the controller 140 as discussed herein can include a computer readable hardware medium for storing the current estimation and mode control algorithm. Such an algorithm supports operations such as power supply switching control functions as discussed herein. For example, in one embodiment, the instructions, when carried out by a controller 140 cause the controller 140 to perform operations as in the flowcharts below.

Figure 9:
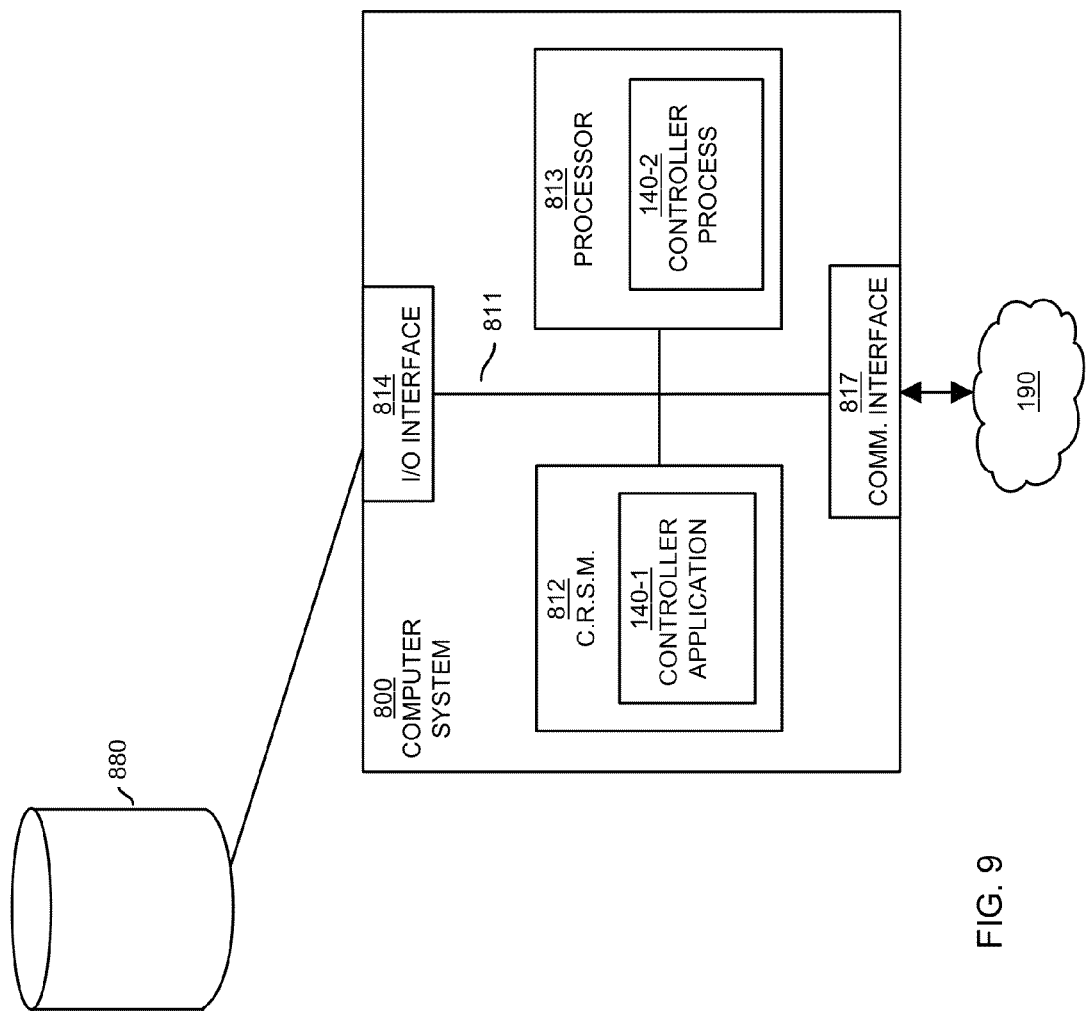
FIG. 9 is a diagram illustrating an example architecture to implement compensation according to embodiments herein.

FIG. 9 is an example diagram illustrating an example architecture for implementing one or more functions provided by controller according to embodiments herein.

As shown, controller 140 can be or include a computerized device such as a processing device, processor, digital signal processor, etc.

As shown, controller 140 of the present example includes an interconnect 811 that couples computer readable hardware storage media 812 such as a non-transitory type of media, computer readable, hardware storage medium, etc., in which digital information can be stored and retrieved. Controller 140 can further include a processor 813, I/O interface 814, and a communications interface 817 to communicate over network 191 or other communication link to a resource such a processor powered by the output voltage 190.

I/O interface 814 provides connectivity to repository 880, and if present, display screen, peripheral devices such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with controller application 140-1. The instructions are executed by a respective resource such as controller 140 to perform any of the operations as discussed herein.

Communications interface 817 enables controller 140 to communicate over a resource such as network 191 to retrieve information from remote sources and communicate with other computers, switches, clients, servers, etc. I/O interface 814 also enables processor 813 to retrieve or attempt retrieval of stored information from repository 880 or other sources.

Those skilled in the art will understand that the controller 140 can be a computer system and include other processes and/or software and hardware components, such as an operating system that controls allocation and use of hardware processing resources to execute controller application 140-1.

Note again that techniques herein are well suited for use in power supply applications. However, it should be noted that embodiments herein are not limited to use in such applications and that the techniques discussed herein are well suited for use in other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via a controller in a power supply:
    receiving output voltage setting information specifying how to control an output voltage of the power supply to power a load;
    producing a compensation value based at least in part on an output capacitance of the power supply and a specified rate of changing a magnitude of the output voltage as specified by the output voltage setting information; and
    utilizing the compensation value to controllably adjust the magnitude of the output voltage in a manner as specified by the output voltage setting information, the output voltage driving the load and the output capacitance; and
    wherein receiving the output voltage setting information includes receiving a voltage slope value indicative of the specified rate of changing the output voltage of the power supply from an initial setting to a target voltage value setting as specified by the output voltage setting information.

2. The method as in claim 1, wherein utilizing the compensation value to controllably adjust the magnitude of the output voltage includes:
    applying the compensation value to a setpoint voltage of the power supply to produce an adjusted setpoint voltage, the adjusted setpoint voltage representing a difference between the setpoint voltage as specified by the output voltage setting information and the compensation value; and
    controlling switches in at least one power converter phase of the power supply based on the adjusted setpoint voltage to controllably adjust the magnitude of the output voltage in a manner as specified by the output voltage setting information.

3. The method as in claim 1 further comprising:
    via the controller in the power supply:
    during a transition of the output voltage to the target voltage value setting a target value as specified by the output voltage setting information, utilizing the compensation value to adjust control signals generated by the controller; and
    applying the adjusted control signals to at least one switching circuit of the power supply to adjust the output voltage of the power supply during the transition of the output voltage to the target voltage value setting, the compensation value adjusting the control signals to accommodate driving a combination of the output capacitance and the load.

4. The method as in claim 1, wherein receiving input includes:
    receiving the output voltage setting information from a processor resource powered by the output voltage, the output voltage setting information indicating future magnitude settings in which to control the magnitude of the output voltage; and
    receiving a rate value from the processor resource, the rate value indicating the specified rate of changing the output voltage of the power supply to a target value.

5. The method as in claim 1, wherein producing the compensation value includes:
    obtaining a load-line resistance value of the power supply;
    multiplying the output capacitance by the specified rate of changing the output voltage to produce a current value, the current value indicating an amount of current to account for a change in voltage on the output capacitance; and
    multiplying the current value by the loadline resistance value to produce the compensation value.

6. The method as in claim 1, wherein utilizing the compensation value includes:
    during the changing of the output voltage to the target voltage value setting a target voltage as specified by the output voltage setting information, applying the compensation value to an error voltage of the power supply to produce the output voltage and account for charging of the output capacitance while simultaneously powering the load.

7. The method as in claim 1, wherein producing the compensation value includes estimating an amount of current needed to be supplied by the power supply to charge the output capacitance of the power supply to change a magnitude the output voltage in accordance with the specified rate of changing the output voltage.

8. The method as in claim 7, wherein utilizing the compensation value to adjust the output voltage includes:
adjusting a reference signal in the power supply by the compensation value, the reference signal used as a basis to produce an error voltage, the error voltage representing a difference between the reference signal and the magnitude of the output voltage, the error voltage used to control the magnitude of the output voltage; and
controlling activation of switches in the power supply based on the error voltage.

9. The method as in claim 1, wherein utilizing the compensation value to adjust the output voltage includes:
applying the compensation value to an error voltage of the power supply to account for discharging of the output capacitance during the changing of the output voltage to the target voltage value setting a target voltage as specified by the output voltage setting information.

10. The method as in claim 1, wherein producing the compensation value includes multiplying a first value by a second value, the first value representing the output capacitance of the power supply, the second value representing the specified rate of changing the magnitude of the output voltage as specified by the output voltage setting information.

11. The method as in claim 1, wherein producing the compensation value includes estimating an amount of current to charge the output capacitance based on the specified rate of changing the output voltage; and
wherein utilizing the compensation value includes adjusting control signals in the power supply to control the magnitude of the output voltage in a manner as specified by the output voltage setting information.

12. A method comprising:
via a controller in a power supply:
receiving input, the input specifying a setpoint value of an output voltage of the power supply used to power a load;
obtaining configuration information, the configuration information specifying an output capacitance of the power supply;
generating a compensation value based at least in part on the output capacitance and a specified rate of ramping the output voltage of the power supply to the setpoint value; and
utilizing the compensation value to adjust the output voltage; and
wherein the specified rate of ramping the output voltage is a voltage slope value, the voltage slope value indicating the specified rate of ramping the output voltage of the power supply from an initial setting to the setpoint value.

13. A power supply system comprising:
a controller including a port on which to receive output voltage setting information, the output voltage setting information specifying how to control an output voltage of the power supply to power a load;
the controller configured to:
produce a compensation value based at least in part on an output capacitance of the power supply and a specified rate of changing a magnitude of the output voltage as specified by the output voltage setting information; and
utilize the compensation value to adjust the output voltage, the compensation value specifying an amount of compensation to controllably adjust the magnitude of the output voltage to accommodate presence of the output capacitance in the power supply and produce a change in the magnitude of the output voltage in a manner as specified by the output voltage setting information; and
wherein receiving the output voltage setting information includes receiving a voltage slope value indicative of the specified rate of changing the output voltage of the power supply from an initial setting to a target voltage value setting as indicated by the output voltage setting information.

14. The power supply system as in claim 13, wherein the controller is configured to:
apply the compensation value to a setpoint voltage of the power supply to produce an adjusted setpoint voltage, the adjusted setpoint voltage representing a difference between the setpoint voltage as specified by the output voltage setting information and the compensation value; and
control switches in at least one power converter phase of the power supply based on the adjusted setpoint voltage.

15. The power supply system as in claim 13, wherein the controller is configured to:
during a transition of the output voltage to the target voltage value setting a target value as specified by the output voltage setting information, utilize the compensation value to adjust control signals generated by the controller; and
apply the adjusted control signals to at least one switching circuit of the power supply to adjust the output voltage of the power supply during the transition of the output voltage to the target voltage value setting.

16. The power supply system as in claim 13, wherein the controller is configured to:
receive the output voltage setting information from a processor resource powered by the output voltage, the output voltage setting information indicating future magnitude settings in which to control the output voltage; and
receive a rate value from the processor resource, the rate value indicating the specified rate of changing the output voltage of the power supply to the target voltage value setting a target value.

17. The power supply system as in claim 13, wherein the controller is configured to:
obtain a load-line resistance value of the power supply;
multiply the output capacitance by the specified rate of changing the output voltage to produce a current value, the current value indicating an amount of current to account for a change in voltage on the output capacitance; and
multiply the current value by the loadline resistance value to produce the compensation value.

18. The power supply system as in claim 13, wherein the controller is configured to:
during the changing of the output voltage to the target voltage value setting a target voltage as specified by the output voltage setting information, apply the compensation value to an error voltage of the power supply to account for charging of the output capacitance.

19. The power supply system as in claim 13, wherein the controller is configured to:
estimate an amount of current needed to be supplied by the power supply to charge the output capacitance of the power supply to change a magnitude the output voltage in accordance with the specified rate of changing the output voltage.

20. The power supply system as in claim 13, wherein the controller is configured to:

multiply a first value by a second value, the first value representing the output capacitance of the power supply, the second value representing the specified rate of changing the magnitude of the output voltage as specified by the output voltage setting information.

21. The method as in claim 1, wherein producing the compensation value includes estimating an amount of current needed to be supplied by the power supply to charge the output capacitance of the power supply to change the magnitude of the output voltage in accordance with the specified rate; and wherein utilizing the compensation value to controllably adjust the output voltage includes controlling activation of switches in the power supply based on the compensation value.

22. The method as in claim 1, wherein producing the compensation value includes: estimating an amount of current needed to be supplied by the power supply to charge the output capacitance of the power supply to change the magnitude of the output voltage in accordance with the specified rate of changing the magnitude of the output voltage; and wherein utilizing the compensation value to controllably adjust the magnitude of the output voltage includes: producing the output voltage to output the estimated amount of current from the power supply to charge the output capacitance of the power supply as well as power the dynamic load while controlling the magnitude of the output voltage as specified by the output voltage setting information.

23. The method as in claim 3, wherein producing the compensation value includes:
multiplying the output capacitance of the power supply by the specified rate of changing the magnitude of the output voltage to produce an estimated current value, the estimated current value indicating amount of surge current to be supplied by the output voltage to account for a desired change in the output voltage on output capacitors of the power supply, the estimated current value representing a surge of how much current is needed to charge the output capacitors during a scheduled change in the magnitude of the output voltage as specified by the output voltage setting information.

* * * * *